(12) United States Patent
Billman et al.

(10) Patent No.: US 9,062,902 B2
(45) Date of Patent: Jun. 23, 2015

(54) DEFROST CONTROL FOR MULTIPLE BARREL FROZEN PRODUCT DISPENSERS

(75) Inventors: Gregory M. Billman, Buffalo, MN (US); Daniel C. Leaver, Westmont, IL (US); Kyle B. Elsom, Batavia, IL (US); Nikolay Popov, Warrenville, IL (US)

(73) Assignee: Cornelius, Inc., St. Paul, MN (US)

( * ) Notice: Subject to any disclaimer, the term of this patent is extended or adjusted under 35 U.S.C. 154(b) by 1508 days.

(21) Appl. No.: 12/148,621

(22) Filed: Apr. 21, 2008

(65) Prior Publication Data

US 2009/0000315 A1  Jan. 1, 2009

Related U.S. Application Data

(60) Provisional application No. 60/925,964, filed on Apr. 24, 2007.

(51) Int. Cl.
| | |
|---|---|
| *F25C 1/04* | (2006.01) |
| *F25B 47/02* | (2006.01) |
| *A23G 9/28* | (2006.01) |
| *F25C 5/10* | (2006.01) |
| *F25B 41/04* | (2006.01) |

(52) U.S. Cl.
CPC . *F25B 47/02* (2013.01); *A23G 9/28* (2013.01); *F25B 41/043* (2013.01); *F25B 47/022* (2013.01); *F25B 2347/021* (2013.01); *F25C 5/10* (2013.01)

(58) Field of Classification Search
CPC ............... F25B 41/043; F25B 47/022; F25B 2347/021; F25B 47/02; F25C 5/10; A23G 9/28

USPC ........... 62/246–256, 277–278, 389–400, 136, 62/199–200, 81, 151, 154, 155, 156, 349, 62/73, 80, 335, 68, 140, 165, 234
See application file for complete search history.

(56) References Cited

U.S. PATENT DOCUMENTS

| | | | | |
|---|---|---|---|---|
| 2,049,413 | A | * | 8/1936 | Cannon ........................... 62/140 |
| 2,608,833 | A | * | 9/1952 | Woodruff ........................ 62/348 |
| 3,823,571 | A | * | 7/1974 | Smith et al. ..................... 62/136 |
| 4,691,527 | A | * | 9/1987 | Ikeda ............................... 62/234 |
| 4,741,171 | A | * | 5/1988 | Toshiyuki ........................ 62/237 |
| 4,869,072 | A | * | 9/1989 | Sexton et al. .................... 62/136 |
| 5,205,129 | A | * | 4/1993 | Wright et al. ..................... 62/68 |

(Continued)

FOREIGN PATENT DOCUMENTS

JP  2000-055530  *  2/2000  .............. F25D 17/06

*Primary Examiner* — Frantz Jules
*Assistant Examiner* — Emmanuel Duke
(74) *Attorney, Agent, or Firm* — Andrus Intellectual Property Law, LLP

(57) ABSTRACT

To defrost one barrel of a two barrel FCB dispenser, a refrigeration system defrosts the one barrel, while neither defrosting nor chilling the other barrel, for either a selected time or until a frozen beverage is drawn from the other barrel, whichever occurs first. Once the selected time or beverage draw occurs, the refrigeration system chills the other barrel until beverage within it is properly frozen, while neither defrosting nor chilling the one barrel. Once beverage in the other barrel is properly frozen, the refrigeration system resumes defrosting the one barrel, whereupon the foregoing cycle is repeated until defrost of the one barrel is complete, at which point the refrigeration system chills the one barrel to refreeze product in it. The arrangement keeps beverage in the other barrel properly frozen during defrosting of the one barrel.

3 Claims, 12 Drawing Sheets

(56) References Cited

U.S. PATENT DOCUMENTS

| | | | |
|---|---|---|---|
| 5,419,150 A * | 5/1995 | Kaiser et al. | 62/342 |
| 5,692,385 A * | 12/1997 | Hollenbeck et al. | 62/154 |
| 5,706,661 A * | 1/1998 | Frank | 62/70 |
| 6,220,047 B1 * | 4/2001 | Vogel et al. | 62/342 |
| 6,637,214 B1 * | 10/2003 | Leitzke et al. | 62/68 |
| 6,679,314 B2 * | 1/2004 | Frank | 165/63 |
| 6,971,245 B2 * | 12/2005 | Kuroyanagi | 62/136 |
| 7,895,845 B2 * | 3/2011 | Every et al. | 62/81 |

* cited by examiner

DEFROST CONTROL FOR MULTIPLE BARREL FROZEN PRODUCT DISPENSERS

This application claims benefit of provisional patent application Ser. No. 60/925,964, filed Apr. 24, 2007.

FIELD OF THE INVENTION

The present invention relates to machines for and methods of making and dispensing frozen products, and in particular to a defrost controller for multi-barrel frozen product dispensers.

BACKGROUND OF THE INVENTION

Frozen product machines, such as frozen carbonated beverage (FCB) machines, utilize a freeze cylinder or barrel for producing a slush beverage or frozen food product. An evaporator coil of a refrigeration system is heat exchange coupled with the freeze barrel for cooling and freezing liquid product delivered into the barrel. A beater bar and scraper assembly is rotated in the barrel to scrape thin iced or frozen layers of the frozen product from the inner surface of the barrel for dispensing to customers. The freeze barrel is periodically defrosted by operating the refrigeration system in a defrost cycle to heat the evaporator coil and thereby warm and melt product in the barrel. A defrost schedule may be manually programmed into the machine, so that defrost cycles occur automatically according to scheduled time periods. A defrost cycle may also be initiated manually should ice particles be viewed in the dispensed beverage product and defrosting deemed necessary.

Frozen product machines often utilize two or more freeze barrels to accommodate service from a single machine of more than one product, such as more than one flavor of frozen beverage. A frozen product machine with a plurality of freeze barrels usually has a single refrigeration system, with an outlet from a compressor coupled through each of a plurality of adjustable expansion valves to inlets to associated ones of a plurality of evaporator coils, with each evaporator coil being heat exchange coupled to an associated one of the freeze barrels. The outlets from the evaporator coils are normally connected together and coupled to a common return to the compressor suction inlet. During defrost of one barrel, the suction pressure on the return side of the refrigeration system rises. Since the barrel evaporator coils have a common outlet, the other barrel(s) will also see a suction pressure rise. This suction pressure rise in other barrel(s) allows the frozen product in them to warm. Given enough time, warming of product in the other barrel(s) causes the product to become unsatisfactory for service to customers.

OBJECT OF THE INVENTION

A primary object of the present invention is to provide an improved defrost control for a multiple barrel frozen product dispenser, which accommodates defrosting of one barrel of the dispenser while maintaining product in the one or more other barrels sufficiently cold to prevent degradation of the product.

SUMMARY OF THE INVENTION

In accordance with the present invention, a frozen product dispenser comprises first and second product freeze barrels; a refrigeration system heat transfer coupled to each freeze barrel and operable to chill each barrel to freeze product therein and to defrost each barrel; and means for operating the refrigeration system to alternately defrost one barrel while neither chilling nor defrosting the other barrel, and to then chill the other barrel while neither chilling nor defrosting the one barrel, to maintain product in the other barrel properly frozen while defrosting of the one barrel is completed.

The frozen product dispenser includes means for delivering product into and for dispensing product from each barrel; means for sensing when product in each barrel is frozen; and means for detecting when each barrel is defrosted. The means for operating the refrigeration system to alternately defrost one barrel while neither chilling nor defrosting the other barrel, and to then chill the other barrel while neither chilling nor defrosting the one barrel, chills the other barrel until it is sensed that product in it is frozen, and the alternate operation of the refrigeration system is continued until it is detected that the one barrel is defrosted.

The invention also contemplates a method of operating a frozen product dispenser having first and second product freeze barrels and a refrigeration system heat transferred coupled to each barrel. The method comprises the steps of alternately operating the refrigeration system to defrost one barrel while neither chilling nor defrosting the other barrel, and to then chill the other barrel while neither chilling nor defrosting the one barrel, to maintain product in the other barrel properly frozen while the one barrel is defrosted.

In a contemplated practice of the method, included are the steps of delivering product into each barrel; dispensing product from each barrel; sensing when product in each barrel is frozen; detecting when each barrel is defrosted; operating the refrigeration system in a first cycle to defrost one barrel while neither chilling nor defrosting the other barrel and then, following operation of the refrigeration system in the first cycle, operating the refrigeration system in a second cycle to chill the other barrel while neither defrosting nor chilling the one barrel, until sensing that product in the other barrel is properly frozen; and repeating performance of the steps of operating the refrigeration system in the first and second cycles until detecting that the one barrel is defrosted.

It is further contemplated that following detecting that the one barrel is defrosted, the step be included of operating the refrigeration system to refreeze product in the one barrel. Also, in operating the refrigeration system in the first and second cycles, the refrigeration system is operated in the first cycle to defrost the one barrel, while neither chilling nor defrosting the other barrel, for either a selected time following commencement of the first cycle or until there is a dispense of product from the other barrel, whichever occurs first, whereupon it is sensed whether product in the other barrel is properly frozen and, if product in the other barrel is not properly frozen, the refrigeration system is operated in the second cycle to chill the other barrel while neither defrosting nor chilling the one barrel until it is sensed that product in the other barrel is properly frozen. Performance of the steps of operating the refrigeration system in the first and second cycles is then repeated until it is detected that the one barrel is defrosted.

DETAILED DESCRIPTION

Figure 1:
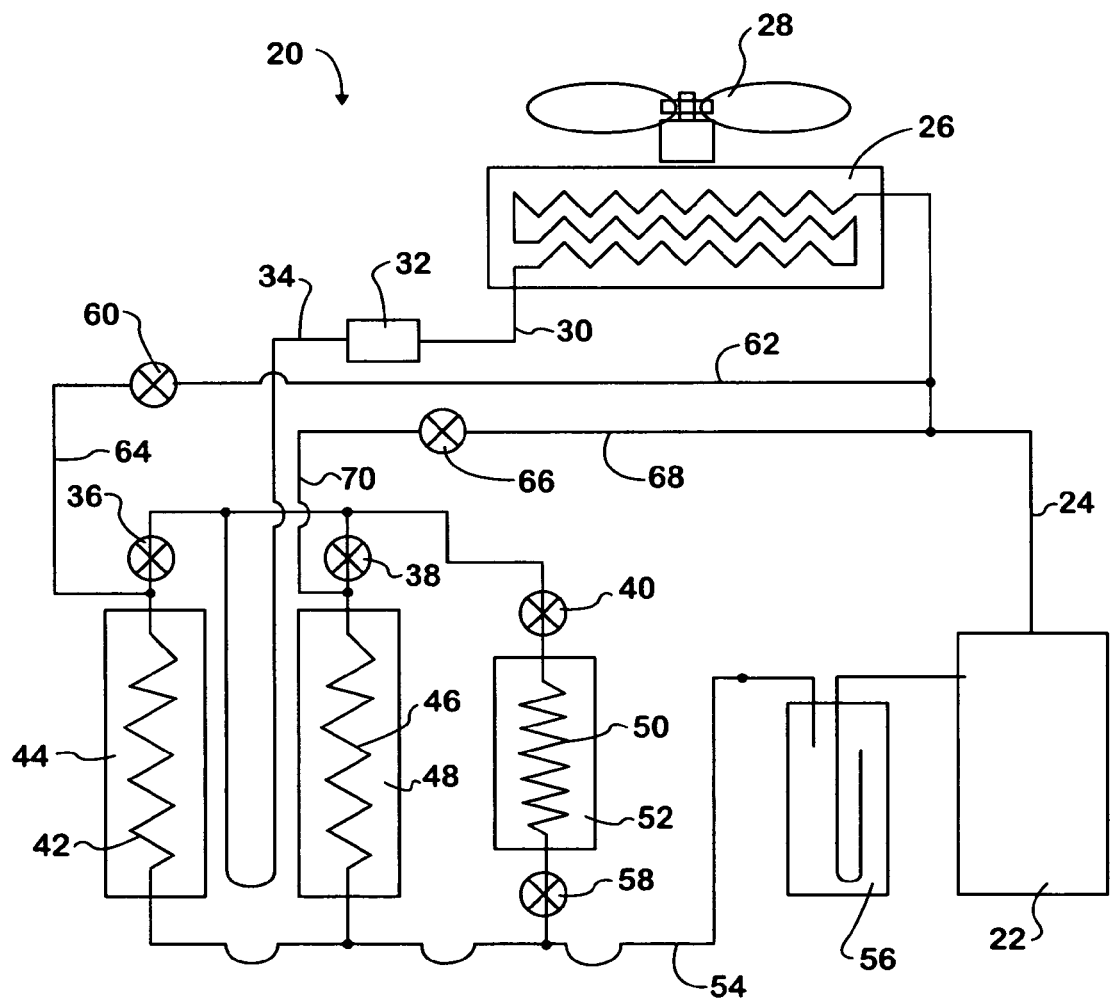
FIG. 1 is a schematic representation of a refrigeration system of a type that may be used to chill each of two product freeze barrels and a pre-chiller of a frozen product dispenser, with which the adaptive defrost control of the present invention may advantageously be used.

The invention provides a novel defrost control for refrigeration systems used to chill freeze barrels of multi-barrel frozen product dispensers, and for convenience will be described in the environment of refrigeration systems for chilling two-barrel frozen product dispensers. Such frozen product dispensers have the ability to dispense either the same or two different types or flavors of frozen product, which frozen product may be of any suitable type, such as frozen beverage. For the purpose of describing the present invention, the product will be considered to be frozen carbonated beverage that is dispensed from two-barrel frozen carbonated beverage dispensers, commonly referred to as FCB dispensers. It is to be understood, however, that the invention can just as readily be used with multi-barrel frozen product dispensers that have more than two product freeze barrels, and that the product can be any suitable product and is not limited to being a frozen carbonated beverage.

Conventionally, an FCB dispenser with more than one freeze barrel, such as with two barrels to permit the service of two different types or flavors of frozen beverage, has a refrigeration system that delivers refrigerant through electronically controlled expansion valves to inlets to evaporators associated with and heat transfer coupled to the barrels in order to chill the barrels and freeze product in the barrels. The evaporators normally have a common outlet on a suction side of the refrigeration system, and during defrost of one of the barrels, the suction pressure on the outlet side of the evaporator associated with the barrel being defrosted will rise. Since the evaporators for the two barrels have a common outlet, the evaporator associated with the alternate barrel, i.e., with the barrel not being defrosted and in which frozen product is contained for service to customers, will also see a suction pressure rise at its outlet. This suction pressure rise at the outlet from the evaporator of the alternate barrel allows frozen product in the barrel to warm. Given enough time, this warming will cause the condition of the product in the barrel to become unsatisfactory and unsuitable for service to customers.

To prevent defrost of one barrel of a two-barrel FCB dispenser from causing excessive warming of the other barrel, the invention contemplates that during defrost of the one barrel, the one barrel be defrosted for either a selected period of time, for example 45 seconds, or until a frozen beverage is drawn from the other barrel, whichever occurs first. Once the time or event occurs, a determination is made whether beverage product in the other barrel requires freezing, and if so the refrigeration system is switched so that defrost of the one barrel ceases and chilling of the other barrel commences until beverage product within it is properly frozen. Once product in the other barrel is properly frozen, the refrigeration system is switched to again defrost the one barrel for the selected time or until a beverage is drawn from the other barrel, whichever occurs first, whereupon a determination is again made whether beverage product in the other barrel requires freezing, and if so the refrigeration system is again switched to terminate defrost of the one barrel and to commence chilling of the other barrel, until product in the other barrel is again properly frozen. This back-and-forth cycling continues until the one barrel achieves a proper termination point and is fully defrosted, which is contemplated to occur when there the evaporator for the one barrel has a sensed outlet temperature on the order of about 50° F., following which the refrigeration system is operated to cool the one barrel and chill product in it to its frozen state. The arrangement provides for refreezing of the barrel not being defrosted on an as needed basis, without allowing frozen product in the barrel not being defrosted to warm and deteriorate in quality.

The invention advantageously increases the up-time of an FCB dispenser by virtue of beverage product in whichever barrel is not being defrosted remaining properly frozen and available for service to customers throughout defrost of the other barrel, resulting in increased sales and customer satisfaction.

Referring to FIG. 1, a refrigeration system of a type as may be used with an FCB dispenser and operated in defrost cycles according to the adaptive defrost control of the invention is indicated generally at 20. The refrigeration system may be of a type as is used in practice of a prescriptive refrigerant flow control as disclosed in co-pending application Ser. No. 11/983,162, filed Nov. 7, 2007, the teachings of which are incorporated herein by reference. The refrigeration system includes a variable speed/capacity compressor 22 that may be a scroll or a reciprocating compressor that is provided with a variable-frequency drive for applying to an ac motor of the compressor an ac voltage signal having a frequency selected to provide a desired speed of operation of the motor and, thereby, a desired output capacity of the compressor. Alternatively, for the purposes of the present invention, the compressor can be a single speed compressor. In any event, hot refrigerant at an outlet from the compressor is coupled through a refrigerant line 24 to an inlet to a condenser 26, through which air is drawn by a fan 28 to cool the refrigerant. Cooled refrigerant at an outlet from the condenser flows through a refrigerant line 30 to and through a filter/dryer 32 and a refrigerant line 34 to inlets to each of three electronically controlled expansion valves 36, 38 and 40 that may be of the stepper motor driven or pulse valve modulated type, such that the valves may be controlled to meter selected refrigerant flows from their outlets. Refrigerant exiting an outlet from the expansion valve 36 is delivered to an inlet to an evaporator coil 42 that is heat transfer coupled to a first beverage product freeze barrel 44 of an FCB dispenser to chill the barrel and freeze beverage product in the barrel. Refrigerant exiting an outlet from the expansion valve 38 is delivered to an inlet to an evaporator coil 46 that is heat transfer coupled to a second beverage product freeze barrel 48 of the dispenser to chill the barrel and freeze beverage product in the barrel. Refrigerant exiting an outlet from the expansion valve 40 is delivered to an inlet to an evaporator coil 50 that is heat transfer coupled to a pre-chiller 52 of the dispenser to chill the pre-cooler and, as will be described, to chill beverage product flowed through the pre-chiller before being introduced into the barrels 44 and 48. After passing through each of the barrel evaporators 42 and 46, refrigerant exiting outlets from the evaporators flows through a refrigerant line 54 and an accumulator 56 to an inlet to the compressor 22. After passing through the pre-cooler evaporator 50, refrigerant exiting the evaporator flows through an evaporator pressure regulating valve 58 and then through the refrigerant line 54 and accumulator 56 to the inlet to the compressor. The evaporator pressure regulating valve 58 serves to prevent the pressure of refrigerant in the evaporator 50 from falling below a lower limit, thereby to prevent freezing of beverage product in the pre-cooler 52.

The refrigeration system 20 has two defrost circuits, a first one of which is for defrosting the freeze barrel 44 and includes a solenoid operated refrigerant valve 60 having an inlet coupled directly to hot refrigerant at the outlet from the compressor 22 through a refrigerant line 62 and an outlet coupled to the inlet to the freeze barrel evaporator 42 through a refrigerant line 64. A second defrost circuit is for defrosting the freeze barrel 48 and includes a solenoid operated refrigerant valve 66 having an inlet coupled directly to hot refrigerant at the outlet from the compressor 22 through a refrigerant line 68 and an outlet coupled to the inlet to the freeze barrel evaporator 46 through a refrigerant line 70. The defrost circuits are operated to heat the evaporators 42 and 46 to defrost the beverage product barrels 44 and 48 in defrost cycles of the refrigeration system. When the refrigeration system is operating to chill the product freeze barrel 44, the refrigerant valve 60 is closed and the expansion valve 36 is open to meter refrigerant to the evaporator 42, and when the refrigeration system is being operated in a defrost mode to defrost product in the freeze barrel 44, the refrigerant valve 60 is open and the expansion valve 36 is closed. Similarly, when the refrigeration system is operating to chill the product freeze barrel 48, the refrigerant valve 66 is closed and the expansion valve 38 is open to meter refrigerant to the evaporator 46, and when the refrigeration system is being operated in a defrost mode to defrost product in the freeze barrel 48, the refrigerant valve 66 is open and the expansion valve 38 is closed.

Figure 2:
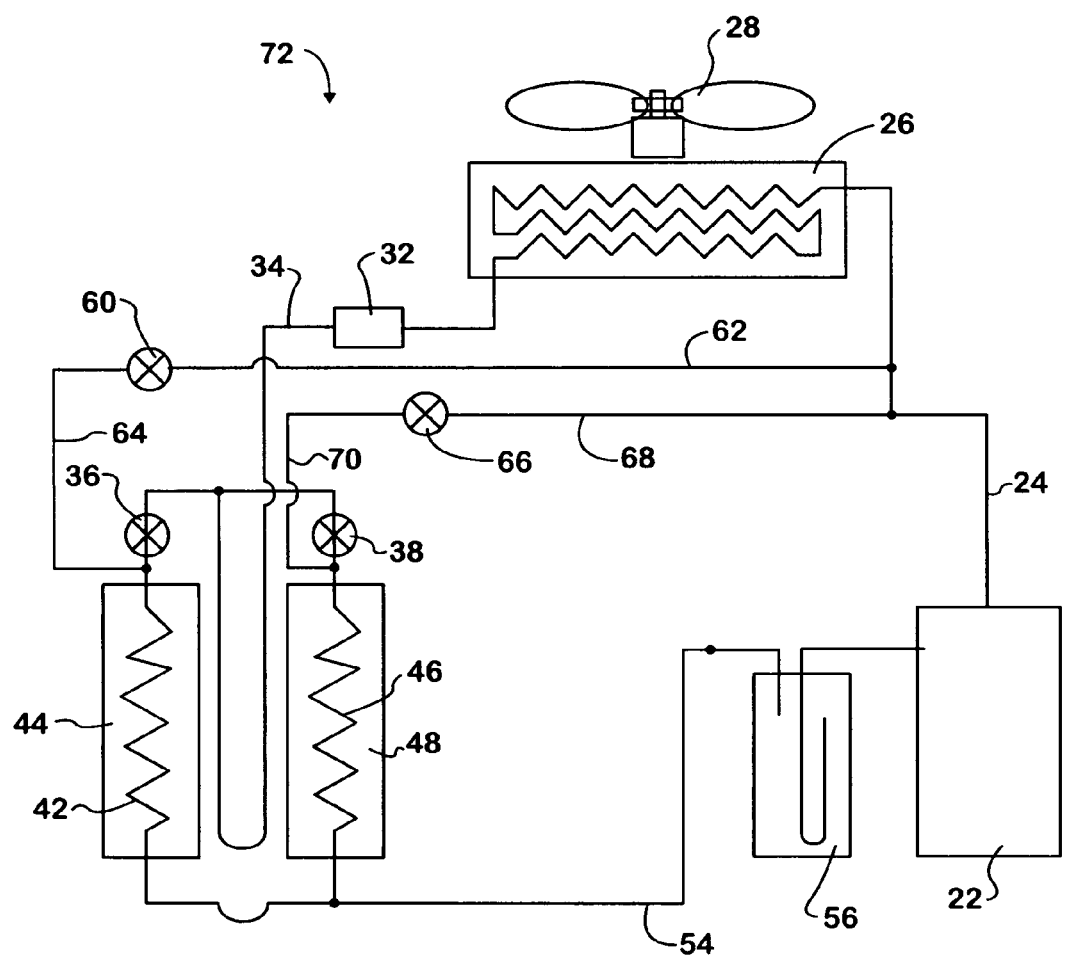
FIG. 2 is similar to the system of FIG. 1, except that the refrigeration system does not provide chilling for a pre-chiller.

The refrigeration system 20 is adapted for use with an FCB dispenser that has a pre-chiller 52. To provide chilling for an FCB dispenser that does not have a pre-chiller, a refrigeration system of a type shown in FIG. 2 and indicated generally at 72 may be used. The refrigeration system 72 is similar to the refrigeration system 20, and like reference numerals have been used to denote like components. A difference between the two systems is that since the system 72 does not provide for cooling of a pre-chiller 52, it does not have an evaporator coil 50, an electronically controlled expansion valve 40 and an evaporator pressure regulating valve 58. Otherwise, the structure and operation of the two refrigeration systems 20 and 72 are similar.

While each refrigeration system 20 and 72 is shown as being structured to provide chilling for a two-barrel frozen product dispenser, which enables two different flavors of frozen beverage product to be prepared by a single frozen beverage product machine, the teachings of the invention may also be used with a frozen product machine that has more than two product freeze barrels. Also, while not specifically shown but understood, each freeze barrel has its own beater bar and scraper assembly, and a separate drive motor is provided for each beater bar and scraper assembly.

Figure 3:
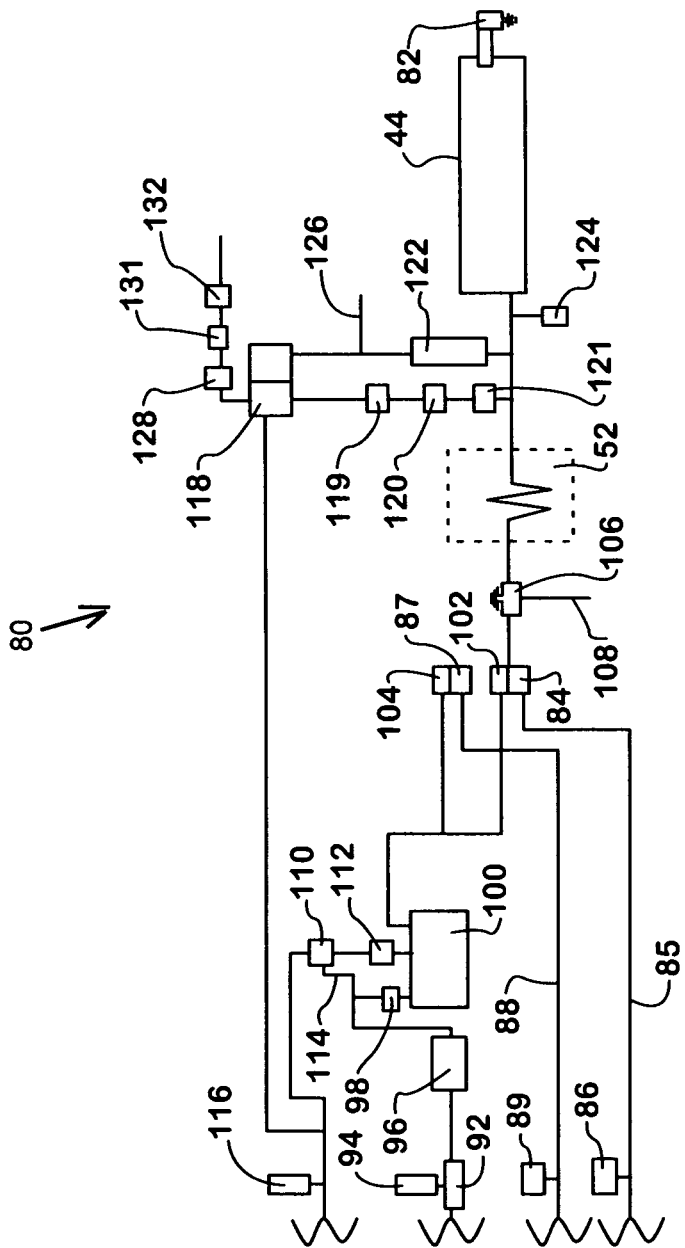
FIG. 3 is a schematic representation of one possible type of frozen beverage dispensing system of a type that may be used with a refrigeration system embodying the adaptive defrost control of the present invention.

One arrangement of FCB dispenser that may utilize the refrigeration system 20 and with which the freeze barrel defrost control of the invention may advantageously be used is shown in FIG. 3 and indicated generally at 80. The dispenser includes the two beverage product freeze barrels 44 and 48, only the barrel 44 being shown. This particular arrangement of FCB dispenser utilizes ambient temperature carbonation, and while not specifically shown in FIG. 3 (but shown in FIG. 1), it is understood that the evaporator coil 42 is heat transfer coupled to the barrel 44 to chill the barrel in order to freeze beverage product mixture introduced into the barrel. With reference to the portion of the dispenser 80 shown and associated with the freeze barrel 44, it being understood that a like description applies to a similar, but less than fully shown, portion of the dispenser associated with the freeze barrel 48, a frozen beverage product dispensing valve 82 is coupled to the barrel 44 for service of frozen beverages to customers. To introduce liquid beverage components into the barrel 44 for being frozen, an externally pumped beverage syrup concentrate (not shown) is delivered to an inlet to a syrup brixing valve 84 through a syrup line 85, to which line is coupled a sensor 86 for detecting a syrup-out condition. To introduce liquid beverage components into the barrel 48 (shown in FIG. 1) for being frozen, an externally pumped beverage syrup concentrate (not shown) is delivered to an inlet to a syrup brixing valve 87 through a syrup line 88, to which line is coupled a sensor 89 for detecting a syrup-out condition. A potable water supply, such as from a city main, is connected to the dispenser through a strainer/pressure regulator 92, to which is coupled a pressure switch 94 for detecting a water-out condition. From the strainer/pressure regulator, the water passes through a carbonator pump 96 and a check valve 98 to a water inlet to a carbonator 100. The carbonator 100 operates in a manner well understood in the art to carbonate water introduced therein, and carbonated water at an outlet from the carbonator is delivered to each of an inlet to a water brixing valve 102 associated with the syrup brixing valve 84 and to an inlet to a water brixing valve 104 associated with the syrup brixing valve 87. The brixing valves 104, 87 comprise an associated pair of brixing valves that delivers a water and syrup mixture, in a selected and adjustable ratio, through an associated fluid circuit (not shown) that includes the pre-chiller 52, to the freeze barrel 48. The brixing valves 102, 84 also comprise an associated pair of brixing valves that delivers a water and syrup mixture, in a selected and adjustable ratio, through an associated fluid circuit that includes the pre-chiller 52, to the freeze barrel 44. The water and syrup beverage mixture provided at an outlet from each pair of brixing valves is in a ratio determined by the settings of the individual valves of each pair, and the mixture passed though the brixing valves 102, 84 is delivered through a check valve 105 and a 3-way valve 106 and the pre-chiller 52 to the freeze cylinder or barrel 44, it being understood that, although not shown (but shown in FIG. 1), the evaporator coil 50 is heat exchange coupled to the pre-chiller. The 3-way valve 106 has an outlet 108 leading to atmosphere, by means of which a sample of the water and syrup mixture output by the pair of brixing valves 102 and 84 may be collected for analysis, so that any necessary adjustments may be made to the brixing valves to provide a desired water/syrup ratio.

To carbonate water in the carbonator tank 100, an externally regulated supply of $CO_2$ is coupled through a temperature compensated pressure regulator 110 and a check valve 112 to the carbonator, with temperature compensation being provided by a capillary sensor 114 that detects the temperature of incoming water. A sensor 116 detects a $CO_2$-out condition, and the supply of $CO_2$ is coupled to inlets to each of two CO$_2$ pressure regulators of a manifold 118. An outlet from a first one of the manifold pressure regulators is coupled through a solenoid shut-off valve 119, a CO$_2$ flow control valve 123 and a CO$_2$ check valve 121 to an inlet to the freeze barrel 44. In addition, CO$_2$ at an outlet from a second one of the manifold pressure regulators is coupled to an upper opening to an expansion tank 122, a lower opening to which is coupled to an inlet to the freeze barrel. The flow control valve 123 accommodates adjustment of the carbonation level in the barrel 44 by enabling the introduction of CO$_2$ into the barrel for a brief period before a mixture of water and syrup is delivered into the barrel. A pressure transducer 124 monitors the pressure of the water and syrup mixture in the barrel 44 and serves as a pressure cut-in/cut-out sensor to control filling and refilling of the barrel with liquid beverage product to be frozen in the barrel. As is understood by those skilled in the art, when the pressure transducer 124 detects a lower limit cut-in pressure in the barrel, for example 23 psi, the pair of brixing valves 102, 84 is opened for flow of a water and syrup mixture to and into the barrel to refill the barrel, until the pressure transducer detects an upper limit cut-out pressure, for example 29 psi, whereupon the pair of brixing valves is closed. During flow of the water and syrup mixture to the barrel, the mixture is cooled as it flows through an associated circuit in the pre-chiller 52. As the beverage mixture is frozen in the barrel 44, it expands and the expansion chamber 122 accommodates the expansion.

As mentioned, the dispenser 80 includes the freeze barrel 48 and, therefore, to the right of the brixing valves 104, 87, it also includes additional structure (not shown) that is generally duplicative of that to the right of the pair of brixing valves 102, 84, which accommodates delivery of a water and syrup mixture from the brixing valves 104, 87 to the barrel 48, except that the beverage mixture does not flow through a separate pre-chiller, but instead flows through an associated circuit of the pre-chiller 52. In addition, a line 126 delivers CO$_2$ to an upper opening to an expansion chamber, a lower opening from which couples to an inlet to the barrel 48, and to accommodate addition of CO$_2$ to the barrel 48, the outlet from the manifold first CO$_2$ pressure regulator is also coupled through a solenoid shut-off valve 128, a CO$_2$ flow control valve 131 and a CO$_2$ check valve 132 to the inlet to the barrel.

In operation of the FCB machine 80, liquid beverage components are introduced through the pre-chiller and into the freeze barrels 44 and 48 by their respective pairs of brixing valves 84, 102 and 87, 104. The refrigeration system 20 provides chilling for the pre-chiller 52 via the heat transfer coupled evaporator 50, so that the liquid beverage components delivered into the freeze barrels 44 and 48 are chilled. The refrigeration system also provides chilling for the freeze barrels 44 and 48 via the respective heat transfer coupled evaporators 42 and 46, to freeze the liquid beverage components in the barrels while the components are agitated by a beater bar/scraper assembly, all in a manner well understood in the art. Frozen beverage product prepared within the freeze barrels is dispensed for service to customers, such a by the dispense valve 82 coupled to the freeze barrel 44.

Figure 4:
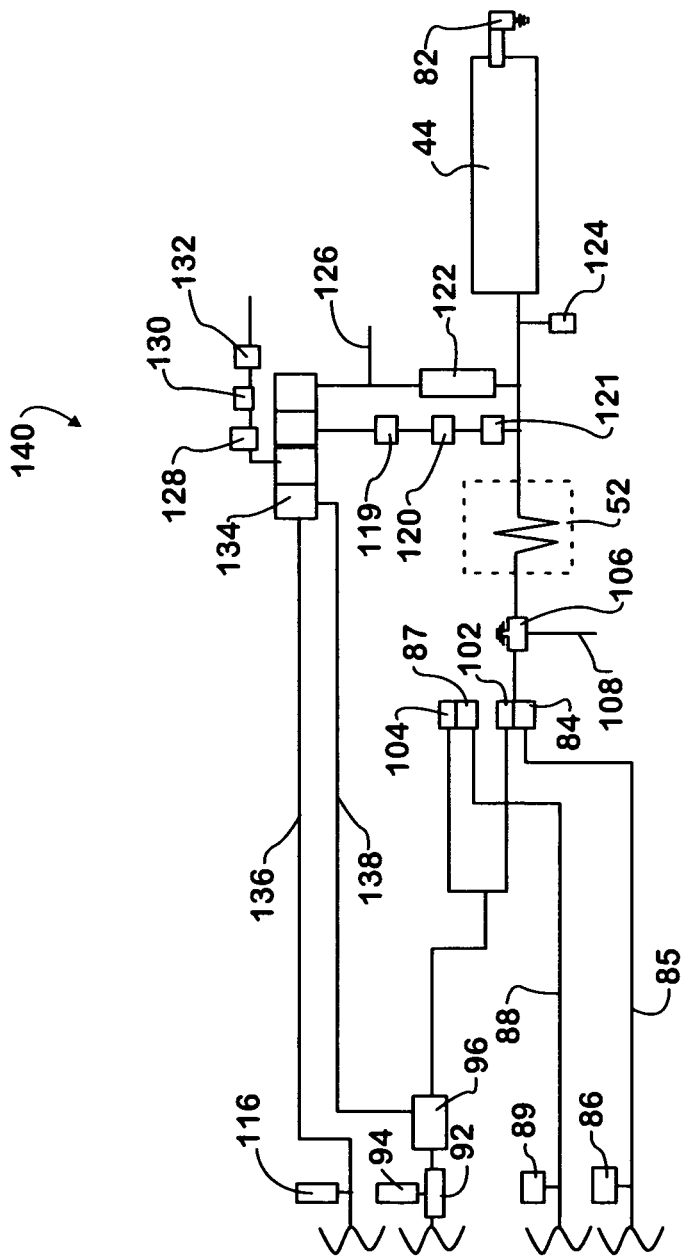
FIG. 4 is a schematic representation of another possible type of frozen beverage dispensing system that may be used with a refrigeration system embodying the adaptive defrost control of the present invention.

Another type of FCB dispenser with which the refrigeration system 20 may be used and operated according to the prescriptive refrigerant flow control scheme of the invention, is shown in FIG. 4 and indicated generally at 140. The dispenser 140 is somewhat similar to the FCB dispenser 80 of FIG. 3, except that it utilizes chilled carbonation, and like reference numerals have therefore been used to denote like components. With reference to the portion of the dispenser 140 associated with the freeze barrel 44, it being understood that a similar description applies to a similar but only partially shown structure of the dispenser associated with the freeze barrel 48, to deliver liquid beverage components to the barrel 44 for being frozen, an externally pumped beverage syrup concentrate is delivered to the syrup brixing valve 84 through the syrup line 85, to which is coupled the sensor 86 for detecting a syrup-out condition. To deliver beverage components to the barrel 48, an externally pumped beverage syrup concentrate is delivered to the inlet to the syrup brixing valve 87 through the syrup line 88, to which is coupled the sensor 89 for detecting a syrup-out condition. A potable water supply is connected to the dispenser through a strainer/pressure regulator 92, to which is coupled a pressure switch 94 for detecting a water-out condition. The outlet from the strainer/pressure regulator 92 is coupled to an inlet to a CO$_2$ driven water pump 96, and unlike the dispenser 80 of FIG. 3, in which the outlet from the water pump is delivered to an inlet to an ambient temperature carbonator 100, in the FCB dispenser 140, an outlet from the water pump 96 is fluid coupled directly to the inlet to each of the water brixing valves 102 and 104. The brixing valves 104, 87 deliver a water/syrup mixture in a selected ratio through an associated fluid circuit (not shown) that includes the pre-chiller 52 to the freeze barrel 48, and the brixing valves 102, 84 deliver a water/syrup mixture in a selected ratio through the 3-way valve 106 and the pre-chiller 52 to an inlet to the freeze barrel 44. The outlet 108 from the valve 106 provides a means by which a sample of the water/syrup mixture flowed from the brixing valves 102, 84 may be collected for analysis, such as by means of a hygrometer reading, so that any necessary adjustments may be made to the brixing valves to provide the desired water/syrup ratio.

An externally regulated CO$_2$ supply is coupled through a line 136 to inlets to each of four CO$_2$ pressure regulators of a manifold 134, to which line is coupled the sensor 116 for detecting a CO$_2$-out condition. An outlet from a first one of the manifold pressure regulators is coupled through a line 138 to the CO$_2$ driven water pump 96 to operate the pump. An outlet from a second one of the manifold CO$_2$ pressure regulators is coupled through the solenoid shut-off valve 119, the CO$_2$ flow control valve 120 and the CO$_2$ check valve 121 to the chilled water/syrup mixture flowing from the pre-chiller 52 to the inlet to the freeze barrel 44, thereby to selectively carbonate the chilled beverage mixture in accordance with the solenoid shut-off valve 119 being open or closed and the setting of the flow control valve 120, whereby either carbonated or non-carbonated beverages may selectively be frozen in the barrel 44. An outlet from a third one of the manifold CO$_2$ pressure regulators is coupled to the upper opening to the expansion tank 122, the lower opening to which is coupled to the water/syrup mixture line extending between the outlet from the pre-chiller 52 and inlet to the freeze barrel 44. When frozen carbonated beverages are served, the flow control valve 120 accommodates adjustment of the carbonation level in the barrel 44. The pressure transducer 124 monitors the pressure of the beverage mixture introduced into and within the barrel and serves as a cut-in/cut-out pressure sensor control refilling of the barrel. When beverage product is frozen in the barrel it expands and the expansion tank 122 accommodates such expansion by receiving some of the beverage product.

Since the dispenser 140 includes the freeze barrel 48, it also includes further structure (not shown) that is generally duplicative of the structure shown to the right of the brix valves 102, 84, to accommodate delivery of a water and syrup mixture from the brix valves 104, 87 to the barrel 48, except that the beverage mixture does not flow through a separate pre-chiller, but instead flows through an associated beverage circuit of the pre-chiller 52. In addition, the line 126 at the outlet from the manifold third $CO_2$ pressure regulator delivers $CO_2$ to an upper opening to an expansion chamber (not shown), a lower opening from which is coupled to the inlet to the barrel 48, and to accommodate carbonating the beverage mixture delivered to the barrel 48, an outlet from a second $CO_2$ pressure regulator of the manifold 118 is coupled through the solenoid shutoff valve 128, the $CO_2$ flow control valve 130 and the $CO_2$ check valve 132 to the chilled beverage mixture intermediate the pre-chiller 52 and the inlet to the barrel 48.

In operation of the FCB dispensers 80 and 140, or for that matter in operation of any multi-barrel FCB dispenser, it is necessary that the freeze barrels 44 and 48 be periodically defrosted by operating the refrigeration system 20 in a defrost cycle to heat the evaporator coils 42 and 46 and their respective barrels 44 and 48 to warm and melt product in the barrels. A defrost schedule may be manually programmed into the machine, so that defrost cycles occur automatically according to predetermined time periods or, advantageously, defrost cycles can be adaptively initiated in accordance with the teachings of co-pending patent application Ser. No. 12/004,590, filed Dec. 21, 2007, the teachings of which are incorporated herein by reference. A defrost cycle may also be manually initiated as ice particles are observed to occur in the dispensed frozen product, which indicates a need to defrost the freeze barrel from which the product was dispensed.

The freeze barrels 44 and 48 of the FCB dispensers 80 and 140 accommodate service of two different products or flavors of product by each dispenser, such as two different types of beverages or two different flavors of frozen beverage, although the same product or flavor could be prepared in each barrel. As is usually the case for a multi-barrel dispenser, each dispenser 80 and 140 uses a single refrigeration system, such as the refrigeration system 20, that is controlled to selectively either chill or heat the evaporators 42 and 46 and their associated freeze barrels 44 and 48, depending upon whether a particular freeze barrel is to be chilled or defrosted. As is also usually the case, the outlets from the evaporators are connected together at a common outlet and coupled to a common suction return to the compressor inlet. A disadvantage of having a common evaporator outlet is that during defrost of one barrel, such as during defrost of the barrel 44 by heating of the evaporator 42, the suction pressure on the return or outlet side of the evaporator 42 rises. Since the evaporators 42 and 46 have a common outlet, the outlet from the evaporator 46 for the barrel 48, which barrel is not to be defrosted, will also experience a suction pressure rise, which reduces the temperature of the evaporator 46 and allows frozen product in the barrel 48 to begin to warm. Given enough time, warming of product in the barrel 48 will cause the product to deteriorate to a less than satisfactory condition for service to customers.

The invention overcomes this disadvantage of the prior art by operating the refrigeration system of a multi-barrel FCB dispenser in a novel manner, which prevents deterioration of product in one of the freeze barrels due to warming of the product incident to defrosting of the other freeze barrel. To this end, and assuming that the refrigeration system 20 of FIG. 1 is being used with the FCB dispenser 140 of FIG. 4, in operation of the dispenser to freeze beverage product in both freeze barrels 44 and 48, the compressor 22 delivers refrigerant to each of the expansion valves 36 and 38, which meter the refrigerant to inlets to their associated evaporators 42 and 46 in accordance with the chilling requirements of the freeze barrels 44 and 48. During the time when the freeze barrels 44 and 48 are being chilled, their respective refrigerant valves 60 and 66, which are operated during defrost cycles of the barrels, are closed and the suction pressure at the outlets from the evaporators 42 and 46 is relatively low.

Normally, the freeze barrels of a multi-barrel frozen product dispenser are defrosted one at a time, so that frozen product is always available for service from at least one of the barrels. In accordance with the teachings of the invention, and assuming that the barrel 44 is to be defrosted, defrosting is accomplished by operating the refrigeration system 20 to close both expansion valves 36 and 38 and open the refrigerant valve 60, while the refrigerant valve 66 remains closed. With the compressor 22 operating, hot refrigerant at its outlet then bypasses the condenser 26 and flows through the refrigerant line 62, the refrigerant valve 60 and the refrigerant line 64 directly to, into, through and out of the evaporator 42 to heat the evaporator and thereby the barrel 44 to warm and melt product within the barrel. Due to the relatively free flow of hot refrigerant through the refrigerant valve 60 to the inlet to the evaporator 42, the low suction pressure that normally exists on the return side of the refrigeration system and at the outlets from the evaporators 42 and 46, when the refrigeration system is not in a defrost cycle, rises. As a result, the pressure differential that existed between refrigerant contained within the evaporator 46 and its outlet, prior to start of defrost of the barrel 44, decreases, with the result that the refrigerant within the evaporator 46 is less able to evaporate and absorb heat from the barrel 48 that is not being defrosted. This allows the temperature of the barrel 48 and the product in it to warm. Also, since hot refrigerant exiting the evaporator 42 is present at the outlet from the evaporator 46, heat is transferred or conducted from the hot refrigerant to the evaporator 46 and barrel 48, further contributing to warming of the barrel 48 and product in the barrel. Given enough time, continued warming of the barrel 48 will cause product in it to become of unsatisfactory quality for service to customers.

To prevent excessive warming of product in the freeze barrel 48 during defrost of the freeze barrel 44, the invention contemplates that the refrigeration system 20 be switched between defrost of the barrel 44 and chilling of the barrel 48, if and as necessary, in a manner to prevent excessive warming of the barrel 48 during defrost of the barrel 44. In particular, the invention contemplates operating the refrigeration system such that, following initiation of a defrost cycle of the barrel 44, the defrost cycle is continued for either a selected time or until product is drawn from the barrel 48, whichever occurs first, whereupon a determination is made whether product in the barrel 48 requires refreezing and, if so, the refrigeration system is operated to terminate defrost of the barrel 44 and initiate chilling of the barrel 48. The value or duration of the selected time is chosen such that, upon initiation of defrost of the barrel 44 and in the absence of a draw of product from the barrel 48, the selected time will expire before the barrel 48 warms sufficiently to degrade the quality of product in it. The selected time may be, for example, 45 seconds, although it may also be less or more than 45 seconds, depending upon the nature of the refrigeration system and FCB dispenser, and is generally chosen such that the time period expires before the barrel 48 would otherwise warm sufficiently for product in it to begin to degrade in quality. The requirement of terminating defrost of the barrel 44 and determining if chilling of the barrel 48 is required, if product is drawn from the barrel 48 before the selected time lapses, is imposed because upon a draw of product from the barrel 48, relative warm replacement product is flowed into the barrel to refill it, which warms the barrel and can require that the barrel be chilled to freeze the product for service to customers. If freezing of product in the freeze barrel 48 is required, the refrigeration system 20 is operated to chill the freeze barrel 48 until product in it is properly frozen, as may be indicated, for example, by an increase in viscosity of the product to a predetermined viscosity value, as measured by the amperage draw of the scraper motor, which amperage draw is in accordance with the torque output of the motor and, thereby, the viscosity of the product. The amperage draw of the scraper motor may also be used, in the first instance, to determine the frozen state of product in the barrel 48 at the end of the selected time period or following draw of a beverage from the barrel, thereby to determine if chilling of the barrel is required. Upon product in the barrel 48 being brought to its properly frozen state, chilling of the barrel 48 is terminated and defrost of the barrel 44 is initiated once again, until either a lapse of the selected time or a draw of product from the barrel 48, whichever occurs first, whereupon the cycle is repeated until the barrel 44 is fully defrosted, as may be determined by a measurement of refrigerant at the outlet from its evaporator 42, for example when evaporator outlet temperature rises to a selected value, such as 50° F. Upon completion of defrost of the barrel 44, the refrigeration system 20 is operated to chill the barrel 44 to refreeze product in it to its properly frozen state and to maintain product in each of the barrels 44 and 48 properly frozen until the next defrost of one of the barrels. It is understood that a similar description applies to defrost of the freeze barrel 48.

Figure 5:
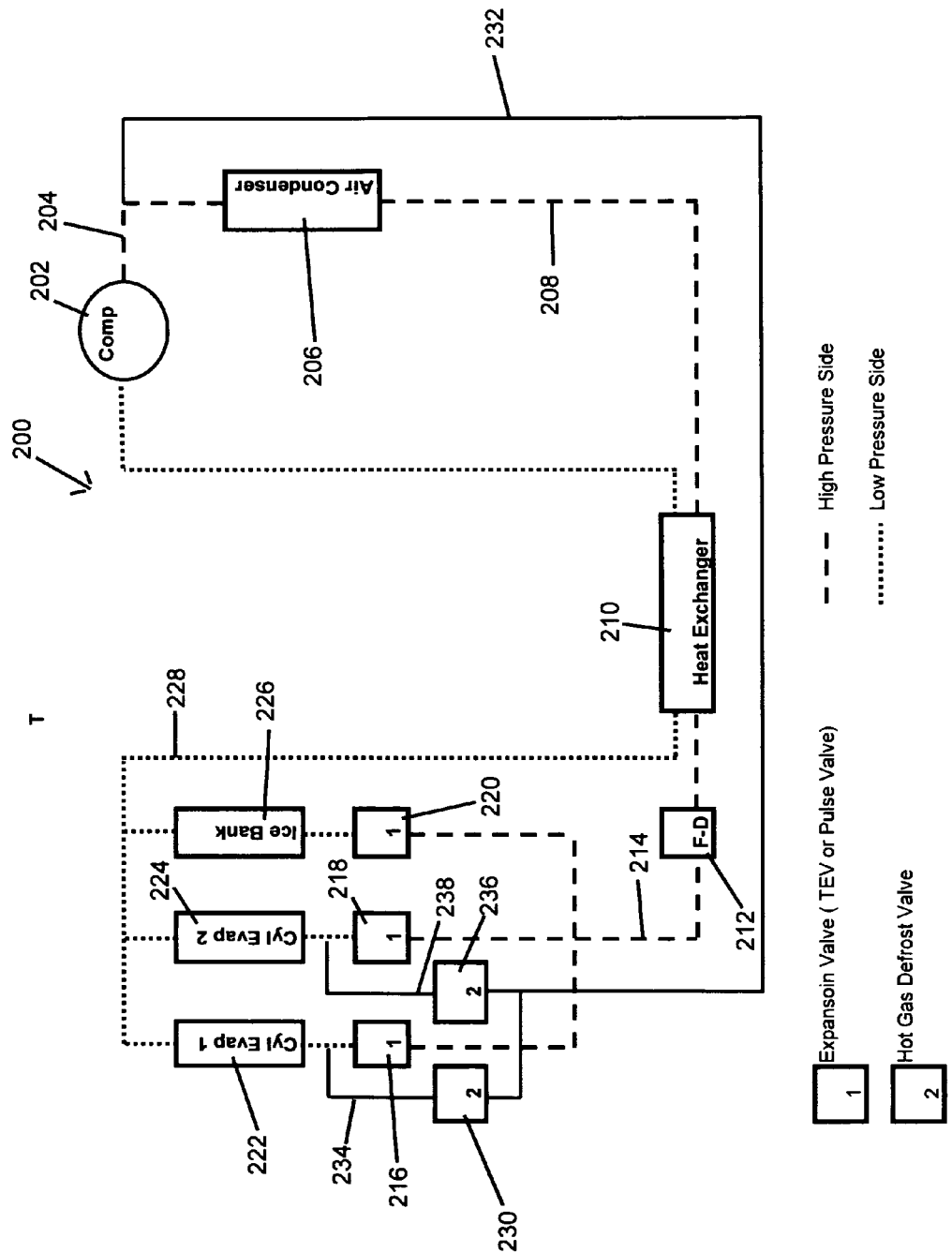
FIG. 5 is a schematic representation of a further type of refrigeration system that may be used to chill product freeze barrels of a frozen product dispenser.

FIG. 5 schematically illustrates a further type of refrigeration system, indicated generally at 200, that may be used with a two-barrel FCB dispenser and operated according to the teachings of the present invention. The refrigeration system 200 is similar to the refrigeration system 20 of FIG. 1 and includes a variable speed/capacity compressor 202, although in practice of the invention the compressor could be single speed. Hot refrigerant at an outlet from the compressor is coupled through a refrigerant line 204 to an inlet to a condenser 206 through which air is drawn to cool the refrigerant. Cooled refrigerant at an outlet from the condenser flows through a refrigerant line 208 to and through a heat exchanger 210, a filter/dryer 212 and a refrigerant line 214 to inlets to each of three expansion valves 216, 218 and 220 that are controlled to meter selected refrigerant flows from their outlets. Refrigerant exiting an outlet from the expansion valve 216 is delivered to an inlet to an evaporator 222 that is heat transfer coupled to a first freeze barrel of an FCB dispenser, which dispenser may be of a type as shown in FIG. 3 or FIG. 4. Refrigerant exiting an outlet from the expansion valve 218 is delivered to an inlet to an evaporator 224 that is heat transfer coupled to a second freeze barrel of the FCB dispenser. Refrigerant exiting an outlet from the expansion valve 220 is delivered to an inlet to an evaporator coil (not shown) that resides in a beverage pre-chiller, which may comprise an ice bank 226 for chilling beverage product flowed through it to chill the beverage product before it is introduced into a freeze barrel. After passing through each of the evaporators, refrigerant exiting a common outlet from the evaporators flows through a refrigerant line 228 and the heat exchanger 210 to an inlet to the compressor 202. The heat exchanger serves to transfer heat from relatively hot refrigerant on the high side of the refrigeration system 200 to refrigerant on the low side, which both aids in further vaporizing refrigerant on the low side, so that liquid refrigerant is not delivered to the suction inlet to the compressor 202, and also further cools hot refrigerant on the high side before it passes through the expansion valves 216, 218 and 220.

The refrigeration system 200 has two defrost circuits. A first defrost circuit is for defrosting the first freeze barrel associated with the evaporator 222, and includes a solenoid operated refrigerant valve 230 that has an inlet coupled directly to hot refrigerant at the outlet from the compressor 202 through a refrigerant line 232, and an outlet coupled to the inlet to the first freeze barrel evaporator 222 through a refrigerant line 234. A second defrost circuit is for defrosting the second freeze barrel associated with the evaporator 224, and includes a solenoid operated refrigerant valve 236 that has an inlet coupled directly to hot refrigerant at the outlet from the compressor through the refrigerant line 232, and an outlet coupled to the inlet to the second freeze barrel evaporator 224 through a refrigerant line 238. In a defrost cycle of the refrigeration system, one of the defrost circuits is used to heat a selected one of the evaporators 222 and 224 to defrost its associated beverage product freeze barrel. When the refrigeration system is operating to chill the first freeze barrel, the refrigerant valves 230 and 236 are closed and the expansion valve 216 is open, and when the refrigeration system is operating to defrost product in the first freeze barrel, the refrigerant valve 230 is open and the expansion valves 216 and 218 are closed. Similarly, when the refrigeration system is operating to chill the second freeze barrel, the refrigerant valves 236 and 230 are closed and the expansion valve 218 is open, and when the refrigeration system is operating in a defrost mode to defrost the second freeze barrel, the refrigerant valve 236 is open and the expansion valves 218 and 216 are closed.

Since the refrigerant valves 216 and 218 do not significantly restrict the flow of refrigerant to inlets to their respective evaporators 222 and 224, when one of the valves is opened to defrost its associated freeze barrel, the suction pressure on the low side of the refrigeration system, at the outlet from the evaporator 222 or 224 associated with the opened refrigerant valve, rises and, since the evaporators share a common outlet, the suction pressure at the outlet from the other evaporator also rises. The rise in suction pressure at the outlet from the other evaporator causes the temperature of that evaporator and its associated freeze barrel to increase. If this increase in temperature is permitted to continue, by the time the one barrel is defrosted, product in the other barrel can warm sufficiently to become of unsatisfactory quality.

The invention contemplates that the refrigeration system 200 be operated during defrost of one of the freeze barrels, such that there is no degradation of product in the other freeze barrel not then being defrosted. Assume that the first barrel, associated with the evaporator 222, is to be defrosted. To defrost the first barrel, the refrigeration system 200 is operated to close both expansion valves 216 and 218 and to open the refrigerant valve 230 while the refrigerant valve 236 remains closed. With the compressor 202 operating, hot refrigerant at its outlet then flows through the refrigerant valve 230 to, into, through and out of the evaporator 222 to heat the evaporator and the first barrel in order to warm and melt product in the barrel. This causes the suction pressure at the outlets from the evaporators 222 and 224 to increase, with the result that the evaporator 224 and its associated second freeze barrel begin to warm. Further contributing to warming of the second freeze barrel is hot refrigerant that exits the evaporator 222 and is present at the outlet from the second freeze barrel evaporator 224. Given enough time, continued warming of the second barrel will cause product in it to rise in temperature sufficiently to become of unsatisfactory quality.

To prevent degradation of the quality of product in the second barrel during defrost of the first barrel, the invention contemplates that the refrigeration system 200 be switched between defrosting the first barrel and chilling the second barrel, in such manner as to prevent excessive warming of product in the second barrel and until defrosting of the first barrel is finished. This is accomplished, following initiation of defrost of the first barrel, by continuing to defrost the first barrel either for a selected time or until product is drawn from the second barrel, whichever occurs first, whereupon a determination is made as to whether product in the second barrel requires refreezing and, if so, the refrigeration system terminates defrost of the first barrel and initiates chilling of the second barrel. The value of the selected time is chosen such that, in the absence of product dispense from the second barrel, the selected time period will lapse before the second barrel warms sufficiently to degrade product in it. The selected time may be, by way of example only, on the order of about 45 seconds, although it may be considerably less or considerably more than 45 seconds, and is chosen in accordance with the characteristics of the particular refrigeration system and frozen product dispenser involved, the criteria being that the selected time expires before the second barrel can warm sufficiently to adversely affect the quality of product in it. As for determining whether initiation of chilling of the second barrel is required upon product being drawn from that barrel, doing so is necessary because a draw of product from the second barrel results in a flow of relative warm product into the second barrel to refill it, which can require that the barrel be chilled to freeze the product in it for service to customers. If it is determined that product in the second barrel requires refreezing, the refrigeration system 200 terminates defrosting of the first barrel and commences chilling the second barrel until product in it is properly frozen, as may be determined by a sensed increase in viscosity of the product to a predetermined level, for example as indicated by a measure of the current draw of the scraper motor, which has a value in accordance with the viscosity of the product. Upon product in the second barrel being properly frozen, chilling of the second barrel is terminated and defrosting of the first barrel is reinitiated, again until either lapse of the selected time or occurrence of a draw of product from the second barrel whereupon the foregoing cycle is repeated until the first barrel is fully defrosted, as may be determined by a measurement of the temperature of refrigerant at the outlet from its evaporator 222, such for example as when temperature rises to a selected value that may be on the order of about 50° F. Upon completion of defrost of the first barrel, the refrigeration system 200 is operated to chill the first barrel to refreeze product in it to its properly frozen state and to maintain product in each of the barrels properly frozen, until defrost of a barrel is again required. It is understood that a similar description applies to defrost of the second freeze barrel.

Figure 6:
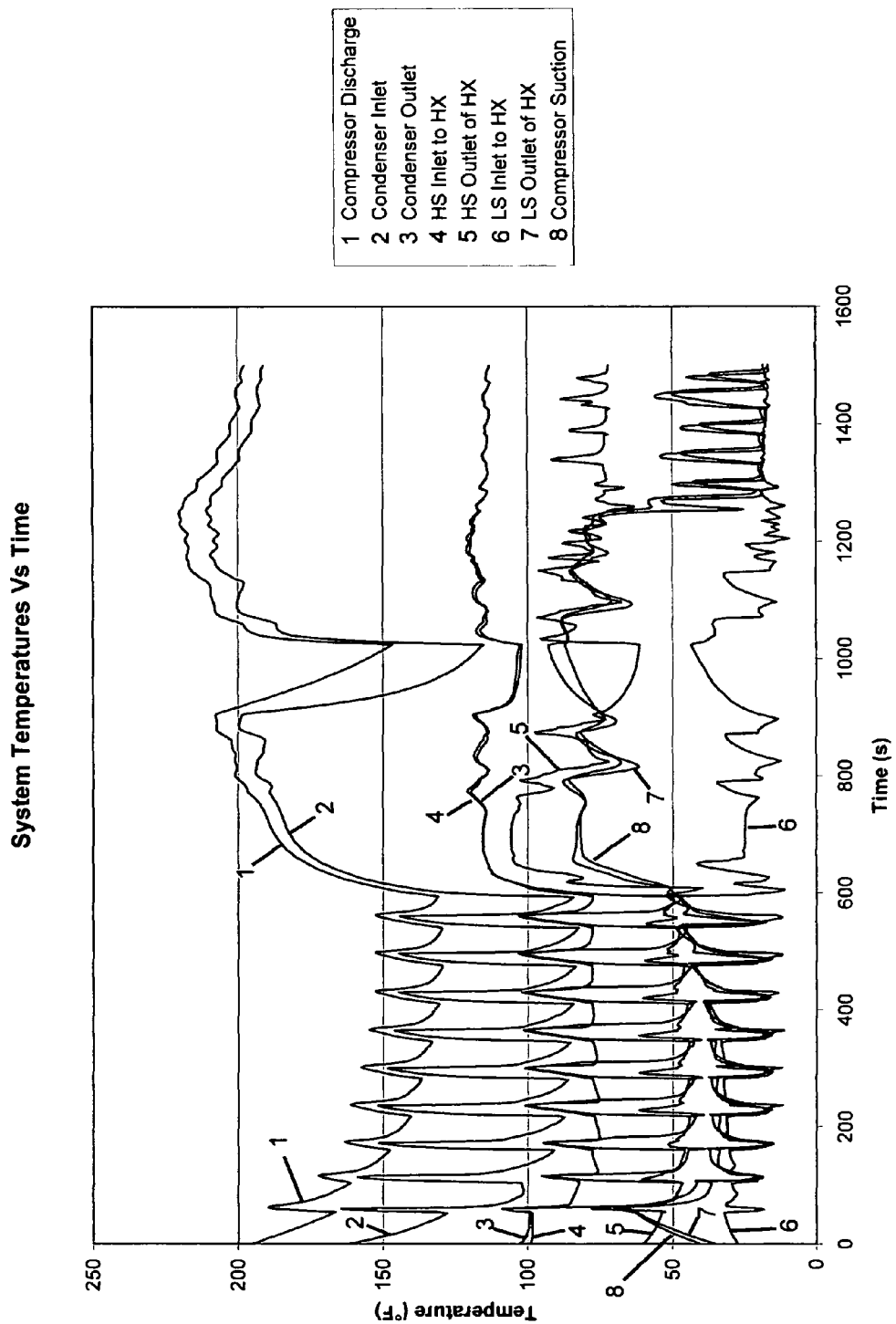
FIGS. 6-11 graphically illustrate various refrigeration system and freeze barrel operating parameters, such as temperature, pressure and power consumption versus time, incident to defrosting one freeze barrel of a two-barrel frozen product dispenser.

The graphs of FIGS. 6-11 show typical operating parameters of a refrigeration system generally configured according to FIG. 5 and when used with a two-barrel frozen product dispensers and operated according to the teachings of the invention to defrost one freeze barrel without allowing the other barrel to warm sufficiently to cause degradation of the quality of product in it. In particular:

FIG. 6 shows refrigeration system temperatures versus time for the temperatures at each of (1) the high side outlet from the compressor 202; (2) the inlet to the condenser 206; (3) the outlet from the condenser 206; (4) the high side inlet to the heat exchanger 210; (5) the high side outlet from the heat exchanger 210; (6) the low side inlet to the heat exchanger; (7) the low side outlet from the heat exchanger; and (8) the suction inlet to the compressor 202.

Figure 7:
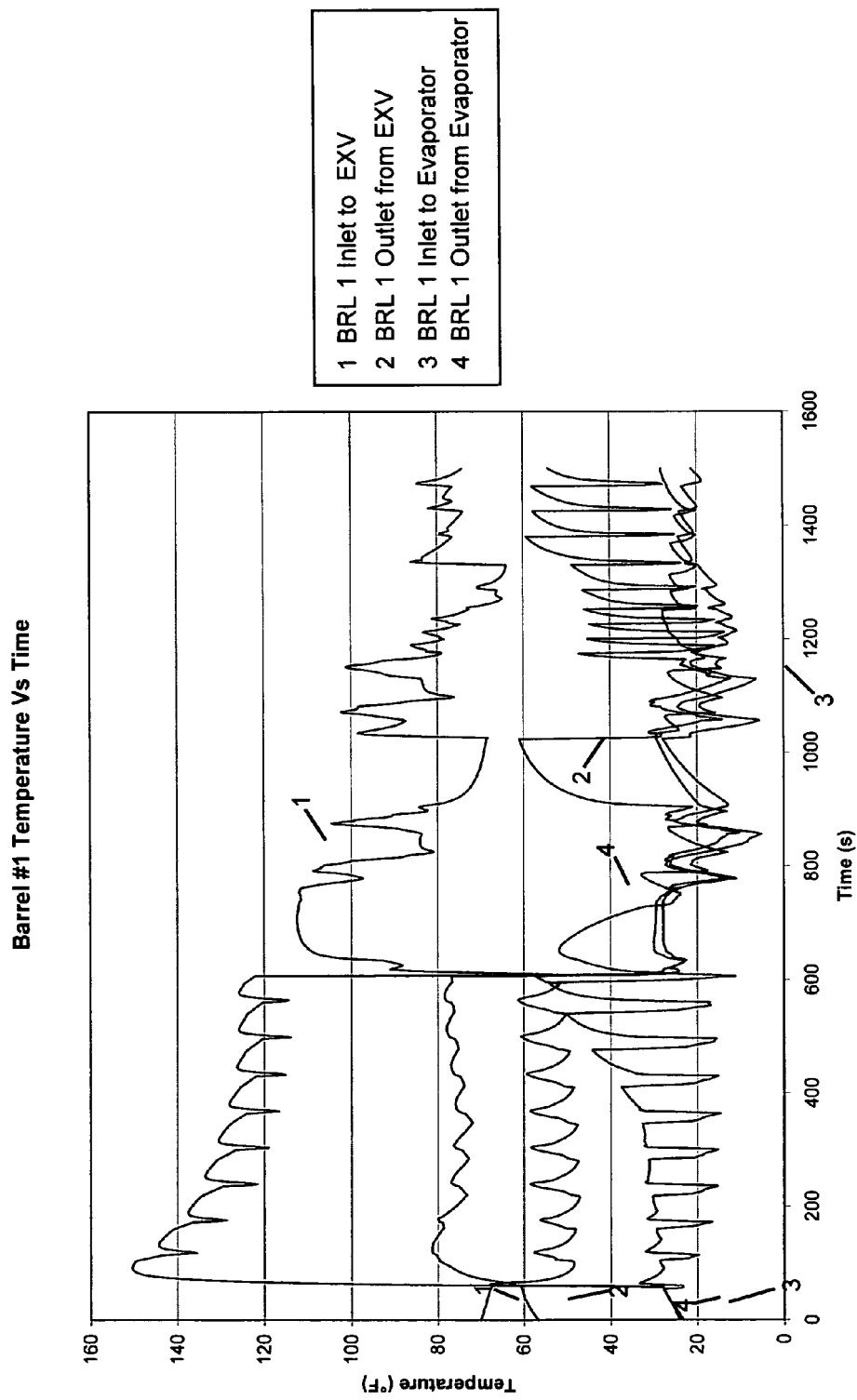

FIG. 7 shows refrigeration system temperatures versus time for temperatures related to the first freeze barrel heat exchange coupled to the evaporator 222 and at each of: (1) the inlet to the expansion valve 216; (2) the outlet from the expansion valve 216; (3) the inlet to the evaporator 222; and (4) the outlet from the evaporator 222.

Figure 8:
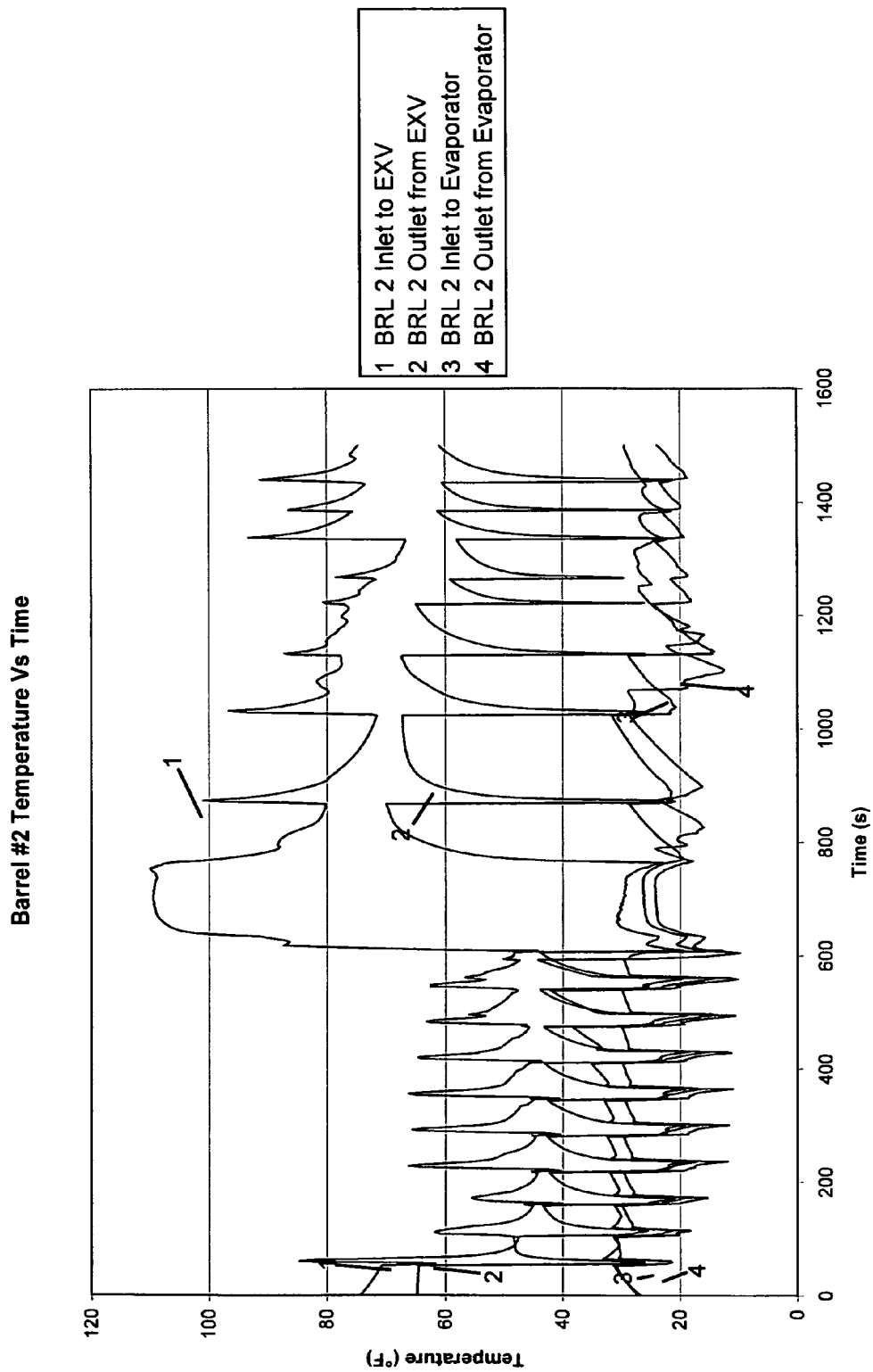

FIG. 8 shows refrigeration system temperatures versus time for temperatures related to the second freeze barrel heat exchange coupled to the evaporator 218 and at each of: (1) the inlet to the expansion valve 218; (2) the outlet from the expansion valve 218: (3) the inlet to the evaporator 224; and the outlet from the evaporator 224.

Figure 9:
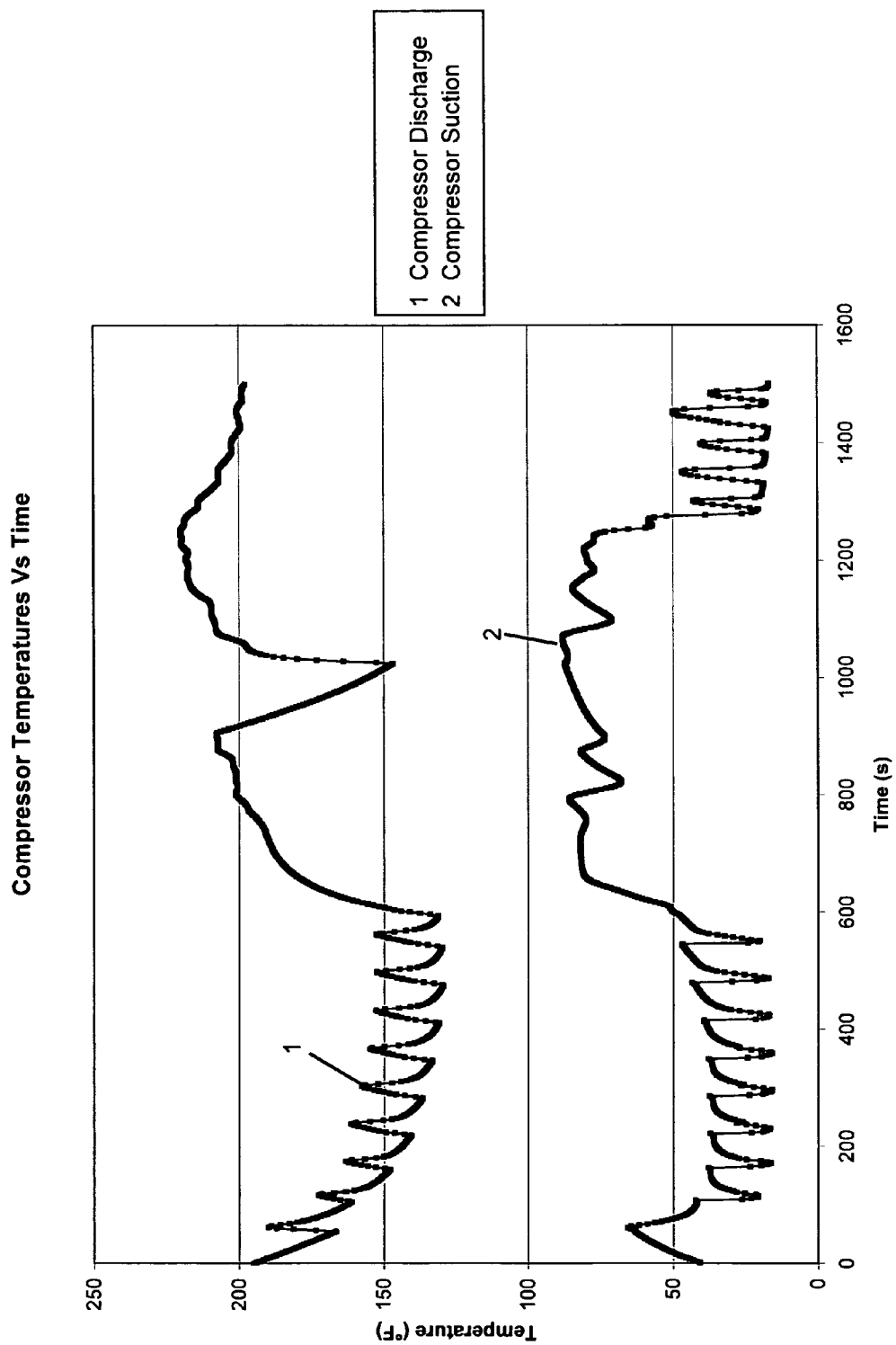

FIG. 9 shows refrigeration system temperatures versus time for the temperatures at each of: (1) the outlet from the compressor 202; and (2) the inlet to the compressor 202.

Figure 10:
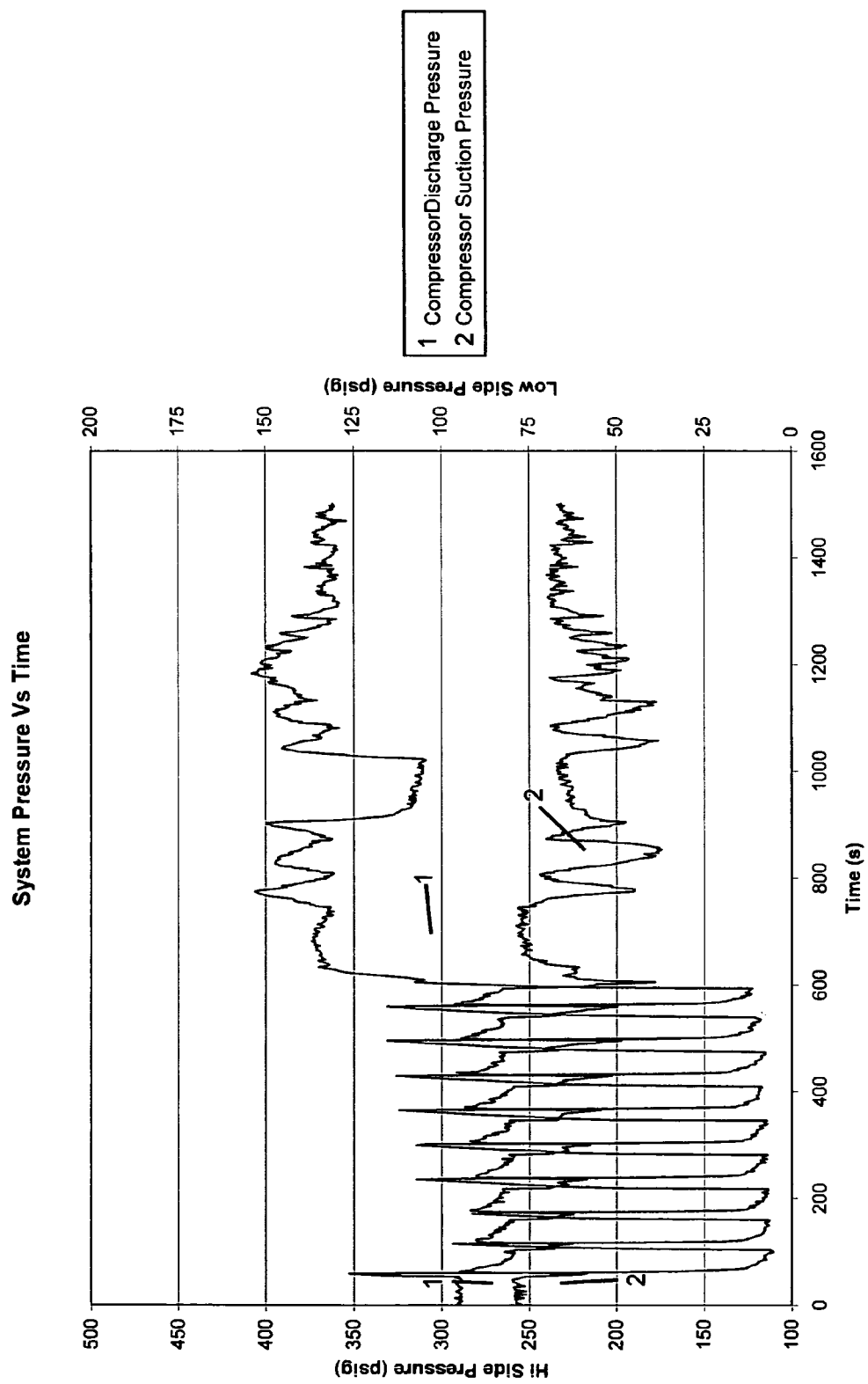

FIG. 10 shows refrigeration system pressures versus time for the pressures at each of: (1) the outlet from the compressor 202; and (2) the inlet to the compressor 202.

Figure 11:
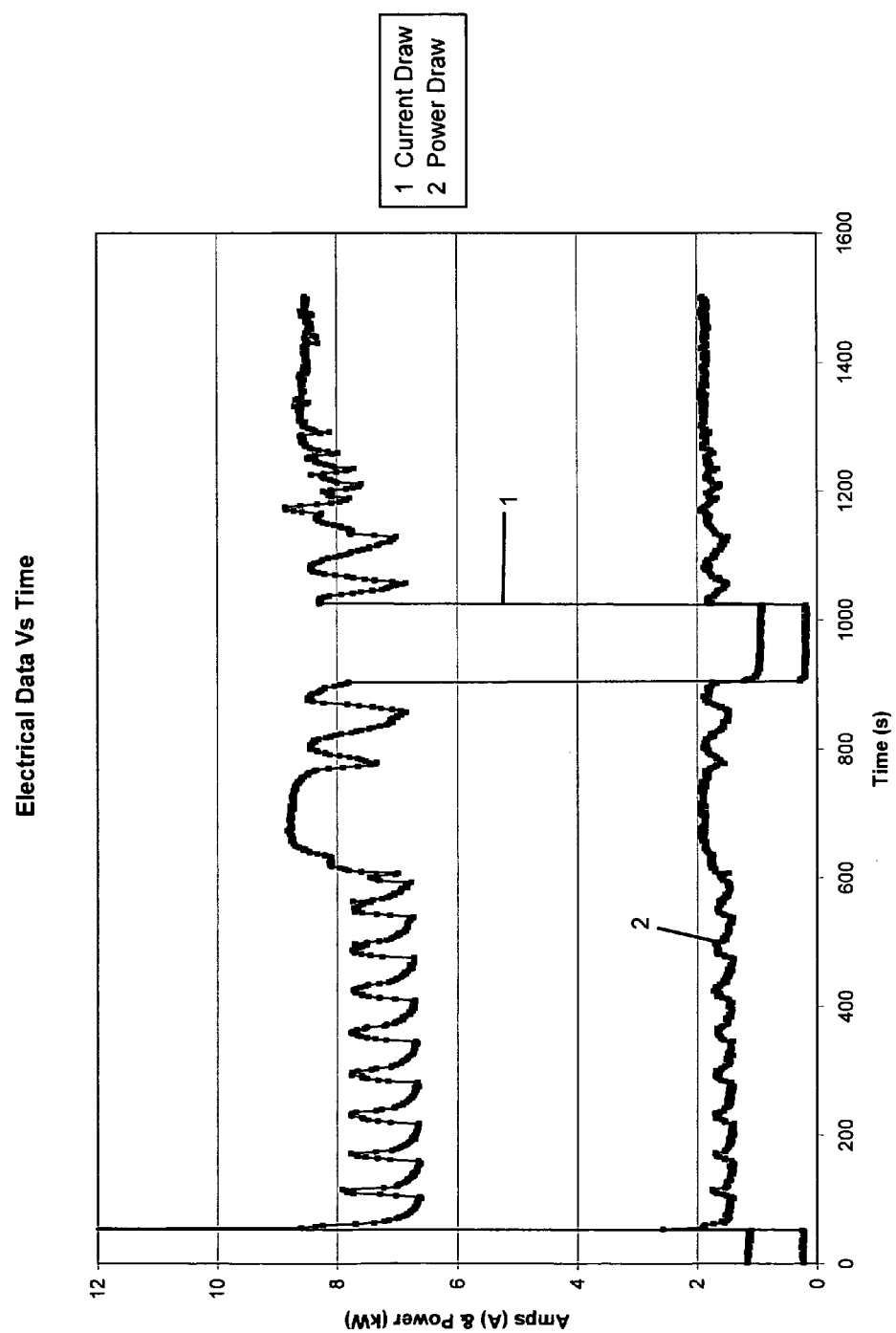

FIG. 11 shows electrical data versus time for the compressor motor for each of (1) the amperage draw of the motor; (2) the power consumption of the motor.

Figure 12:
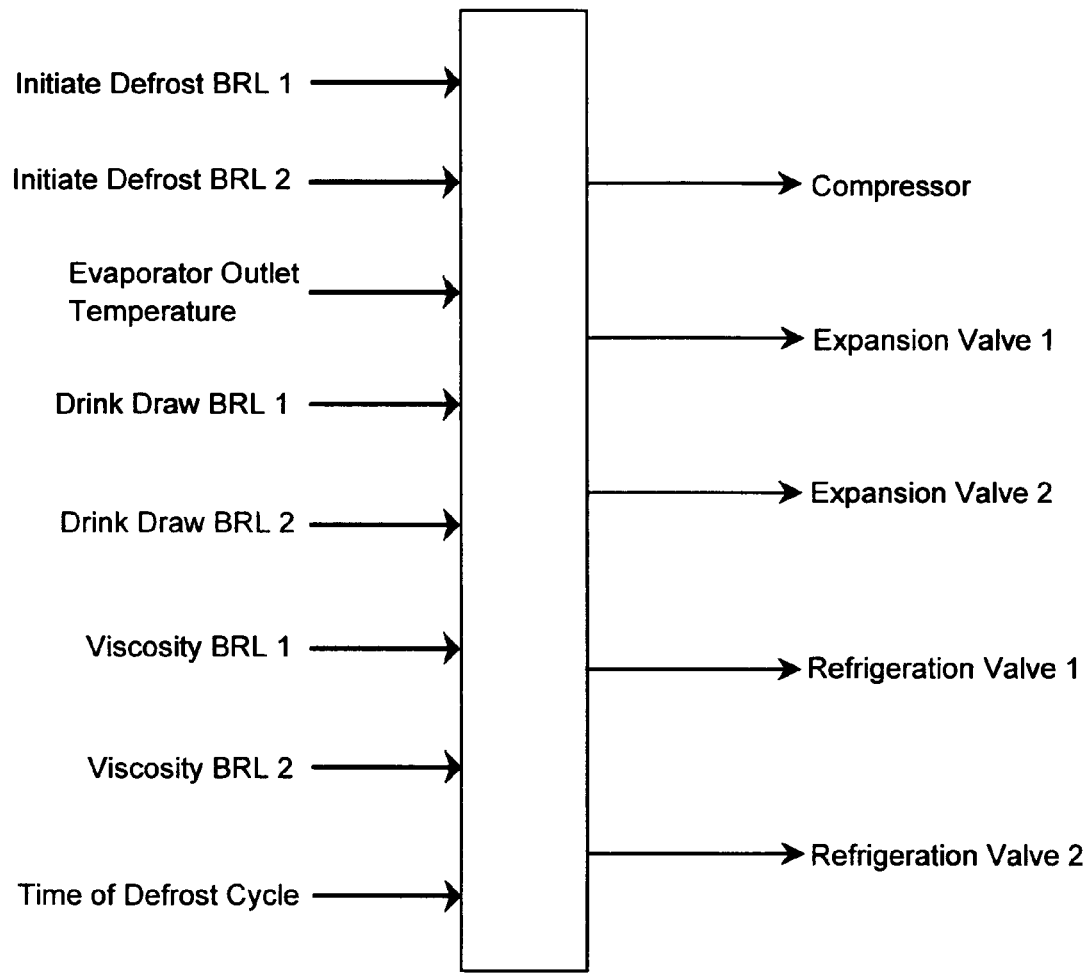
FIG. 12 is a block diagram of a control circuit of a type as may be used to operate a refrigeration system used to chill a two freeze barrel frozen product dispenser and embodying the adaptive defrost control of the present invention.

FIG. 12 is a block diagram of a circuit of a type as may be used to control a refrigeration system in accordance with the teachings of the invention, such as the refrigeration system 200, in performing defrost cycles of one of the first and second barrels of a frozen product dispenser, maintains product in the other barrel properly chilled.

The invention thus provides improved operation of a refrigeration system for a multi-freeze barrel frozen product dispenser, so as to provide for defrosting one of the barrels of the dispenser while preventing excessive warming and degradation of product in the other barrel(s). It is understood that while the invention has been described in terms of operation of a refrigeration system used with a two-barrel frozen carbonated beverage dispenser, the dispenser could be for any other suitable type of frozen product. Also, while operation of a refrigeration system according to the invention has been described in connection with chilling and defrosting the freeze barrels of a two-barrel frozen product dispenser, the teachings of the invention also apply to operation of a refrigeration system for a frozen product dispenser having more than two barrels, such as three or four or more barrels. In the case of a dispenser having more than two barrels, while one of the barrels is being defrosted, the other barrels would be chilled, if and as necessary, in the same manner as would be the alternate barrel of a two-barrel dispenser.

While embodiments of the invention have been described in detail, various modifications and other embodiments thereof may be devised by one skilled in the art without departing from the spirit and scope of the invention, as defined in the appended claims.

What is claimed is:

1. A food product dispenser comprising:
    first and second freeze barrels that are configured to contain food product;
    a refrigeration system that is configured to chill the first freeze barrel to thereby freeze the food product in the first freeze barrel and alternately to defrost the first freeze barrel to thereby unfreeze the food product in the first freeze barrel,
    wherein the refrigeration system is further configured to chill the second freeze barrel to thereby freeze the food product in the second freeze barrel and alternately to defrost the second freeze barrel to thereby unfreeze the food product in the second freeze barrel; and
    a controller that controls the refrigeration system to
    i. defrost the first freeze barrel while neither chilling nor defrosting the second freeze barrel for a time period or until food product is dispense from the second freeze barrel,
    ii. thereafter chill the second freeze barrel until good product in the second freeze barrel is frozen, and
    iii. repeat steps i-ii until the first freeze barrel is defrosted.

2. Te dispenser according to claim 1, wherein the refrigeration system comprises first and second evaporators that are heat transfer coupled to the first and second freeze barrels, respectively, wherein the first evaporator and second evaporator are connected to a common outlet.

3. A method of dispensing food product from a food product dispenser having first and second freeze barrels, the method comprising:

operating a refrigeration system to chill the first freeze barrel to thereby freeze the food product in the first freeze barrel and alternately to defrost the first freeze barrel to thereby unfreeze the good product in the first freeze barrel, operating the refrigeration system to chill the second freeze barrel to thereby freeze the food product in the second freeze barrel and alternately to defrost the second freeze barrel to thereby unfreeze the food product in the second freeze barrel; and operating the refrigeration system to (i) defrost the first freeze barrel while neither chilling nor defrosting the second freeze barrel for a time period or until the food product is dispensed from the second freeze barrel, (ii) thereafter chill the second freeze barrel until food product in the second freeze barrel is frozen, and (iii) repeat steps i-ii until the food product in the first freeze barrel is defrosted.

* * * * *

UNITED STATES PATENT AND TRADEMARK OFFICE
CERTIFICATE OF CORRECTION

PATENT NO. : 9,062,902 B2
APPLICATION NO. : 12/148621
DATED : June 23, 2015
INVENTOR(S) : Gregory M. Billman et al.

It is certified that error appears in the above-identified patent and that said Letters Patent is hereby corrected as shown below:

In the claims

In claim 1, at column 14, line 60, "dispense" should instead read --dispensed--.

In claim 1, at column 14, line 62, "good" should instead read --food--.

In claim 2, at column 14, line 65, "Te" should instead read --The--.

In claim 3, at column 15, line 9, "good" should instead read --food--.

Signed and Sealed this
Thirteenth Day of October, 2015

Michelle K. Lee
*Director of the United States Patent and Trademark Office*